United States Patent [19]

Bruskotter et al.

[11] 4,221,676

[45] Sep. 9, 1980

[54] PHOSPHOR PURIFICATION PROCESS

[75] Inventors: Charles B. Bruskotter; David R. Hamilton, both of Ottawa, Ohio

[73] Assignee: GTE Products Corporation, Stamford, Conn.

[21] Appl. No.: 35,890

[22] Filed: May 4, 1979

[51] Int. Cl.$^2$ ............................................. C09K 11/10
[52] U.S. Cl. .............................................. 252/301.6 F
[58] Field of Search .................. 252/301.4 F, 301.6 F; 423/326; 427/157; 209/5, 160, 167, 208; 23/293 A; 210/49, 56, 59, 71

[56] References Cited

U.S. PATENT DOCUMENTS

| | | | |
|---|---|---|---|
| 2,844,540 | 7/1958 | Rulon | 252/301.6 F |
| 3,047,512 | 7/1962 | Martyny | 252/301.4 P |
| 3,082,344 | 3/1963 | Thornton | 252/301.6 S |
| 3,273,806 | 9/1966 | Aoki | 252/301.4 R |
| 3,351,194 | 11/1967 | Butler | 209/160 |
| 3,447,682 | 6/1969 | Hedler | 209/167 |
| 3,538,013 | 11/1970 | Graft | 252/301.4 P |
| 3,586,635 | 6/1971 | Vanilc | 252/301.6 F |
| 3,757,938 | 9/1973 | Wachtel | 252/301.6 F |

OTHER PUBLICATIONS

Bull, The Thermolumienscence Characteristics of Silicate Phosphors Activated by Manganese and Arsenic, Journal of the Electrochemical Society, Sep. 1951, pp. 371-375.

Primary Examiner—Ernest G. Therkorn
Attorney, Agent, or Firm—William H. McNeill

[57] ABSTRACT

A process for removing suspected heavy metal contaminants from a manganese-arsenic activated, zinc orthosilicate phosphor comprises contacting the phosphor, in an aqueous slurry, with an organic chelating agent such as an alkali metal salt of ethylenediamine tetraacetate and subsequently rinsing, filtering, drying and sieving the phosphor and baking the sieved phosphor.

9 Claims, No Drawings

PHOSPHOR PURIFICATION PROCESS

TECHNICAL FIELD

This invention relates to a process for purifying phosphors and more particularly to a process for removing contaminants from cathodoluminescent phosphors employed in monitor tubes.

BACKGROUND ART

Certain contaminants in monitor tube phosphors, believed to be heavy metals; i.e., metals having a specific gravity greater than 5.0, cause a majority of the scrap items in the production of these tubes. The problem manifests itself as numerous black spots appearing on the screen; these spots being visible mainly after bake-out. Previous attempts to solve this problem and rid the screen of these deleterious black spots have involved double baking the screens and keeping the phosphor suspension fresh. Results from these techniques have proven ineffectual, occasionally performing their function but often showing no improvement. Furthermore, application of these techniques induce production bottlenecks which increase the cost in a highly competitive industry and are thus economically unfeasible.

DISCLOSURE OF THE INVENTION

It is, therefore, an object of the invention to obviate the disadvantages of the prior art.

It is another object of the invention to enhance the useability of monitor tube phosphors and thus the producibility of monitor tubes.

These objects are accomplished in one aspect of the invention by a process which involves contacting the contaminated phosphor, in an aqueous slurry, with a chelating agent and subsequently rinsing, drying and sieving the phosphor.

Employing this process eliminates the black spot problem from monitor tube screens and greatly enhances the production thereof. As stated above, it is believed the spotting problem is caused by the heavy metal contamination of the phosphor and the use of the chelating agent solves this problem by removing these heavy metals.

BEST MODE FOR CARRYING OUT THE INVENTION

For a better understanding of the present invention, together with other and further objects, advantages and capabilities thereof, reference is made to the following disclosure and appended claims.

Referring now to the invention with greater particularity, the process involved has particular applicability to the removal of contaminants from a manganese-arsenic activated, zinc orthosilicate phosphor ($Zn_{2-x-y}SiO_4:Mn_xAs_y$). This phosphor is green emitting under electron excitation and has the proper decay characteristics for use in monitor tubes.

This phosphor is also one which, for many years, has been troubled with black spots appearing after it has been screened.

The process involves contacting the phosphor, in an aqueous slurry, with a chelating agent. A suitable organic chelating agent is ethylenediamine tetraacetate (EDTA); however, tests have shown that the solubility of EDTA in water is very limited. A preferred form of chelating agent is an alkali metal salt of EDTA such as disodium ethylenediamine tetraacetate, which is commercially available. In the absence of the commercially available salt described above, a suitable chelating agent can be manufactured by adding to an EDTA base a stoichiometric amount of an alkali metal hydroxide, such as NaOH, to form, probably, disodium ethylenediamine tetraacetate dihydroxy. Use of the latter compound provides excellent results.

The following non-limiting example will describe in detail a specific embodiment, it being understood that the amounts of material disclosed may be scaled up to reach production quantities.

In a 4.0 liter beaker provide 2.3 liters of deionized water and to this add 37.2 grams disodium ethylenediamine tetraacetate dihydroxy, made as described above, and agitate to dissolve.

Heat the solution to 45° C.±5° C. and slowly add 5 pounds of phosphor with substantially continuous agitation to form a slurry and continue mixing for about 30 minutes.

Stop agitation and allow the phosphor to settle out of the slurry and decant the supernatent liquid.

Reslurry with deionized water and again allow to settle and decant.

Repeat above step at least once more to insure thorough rinsing of the phosphor.

Reslurry again with deionized water and filter the slurry employing a suitable filter such as Whatman No. 50 filter paper.

Dry the filtered phosphor for about at least 12 hours at about 105° C. and subsequently sift the dried phosphor through a 270 mesh stainless steel screen. Bake 1 hour at 460° C.

Employment of this process effectively removes the suspected heavy metal contaminants from the zinc orthosilicate phosphor described above, and screens made from this purified phosphor are free from the previously prevalent black spot condition which resulted in high monitor tube scrap levels.

While there have been shown what are at present considered to be the preferred embodiments of the invention, it will be apparent to those skilled in the art that various changes and modifications can be made herein without departing from the scope of the invention as defined by the appended claims.

We claim:

1. In a method of decontaminating a manganese-arsenic activated zinc orthosilicate phosphor the steps comprising: preparing a hot aqueous slurry of said phosphor, deionized water and an alkali metal salt of an organic chelating agent; agitating said slurry for a given period of time; settling out said phosphor and decanting the supernatent liquid; rinsing said phosphor with deionized water and again decanting; reslurring said phosphor with deionized water and filtering said phosphor from said slurry; drying said phosphor; and sifting said phosphor through a stainless steel mesh.

2. The method of claim 1 wherein said organic chelating agent is ethylenediamine tetraacetate.

3. The method of claim 2 wherein said alkali metal is sodium.

4. The method of claim 3 wherein said hot aqueous slurry is at a temperature of about 40° C. to 50° C.

5. The method of claim 4 wherein said given period of time is about 30 minutes.

6. The method of claim 5 wherein said phosphor is rinsed at least twice.

7. The method of claim 6 wherein said phosphor is dried for about 12 hours at about 105° C.

8. The method of claim 7 wherein said dried phosphor is sifted through a 270 mesh.

9. The method of claim 8 wherein said sifted phosphor is baked at 460° C. for one hour.

* * * * *